(12) United States Patent
Qian (10) Patent No.: US 7,257,538 B2
(45) Date of Patent: Aug. 14, 2007

(54) GENERATING ANIMATION FROM VISUAL AND AUDIO INPUT

(75) Inventor: Richard J. Qian, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 795 days.

(21) Appl. No.: 10/266,226

(22) Filed: Oct. 7, 2002

(65) Prior Publication Data

US 2004/0068408 A1 Apr. 8, 2004

(51) Int. Cl.
*G10L 21/00* (2006.01)
(52) U.S. Cl. .................................... 704/270
(58) Field of Classification Search ................ 704/270
See application file for complete search history.

(56) References Cited

U.S. PATENT DOCUMENTS

| 6,330,023 | B1* | 12/2001 | Chen | 348/14.13 |
| 6,657,628 | B1* | 12/2003 | Cook | 345/473 |
| 6,661,418 | B1* | 12/2003 | McMillan et al. | 345/473 |
| 6,697,120 | B1* | 2/2004 | Haisma et al. | 348/515 |
| 6,772,122 | B2* | 8/2004 | Jowitt et al. | 704/270 |
| 6,778,252 | B2* | 8/2004 | Moulton et al. | 352/12 |
| 6,813,607 | B1* | 11/2004 | Faruquie et al. | 704/276 |

* cited by examiner

*Primary Examiner*—Susan McFadden
(74) *Attorney, Agent, or Firm*—Caven & Aghevli, LLC (57) ABSTRACT

A technique for generating an animated character based on visual and audio input from a live subject. Further described is a technique of extracting phonemes to select corresponding visemes to model a set of physical positions of the subject or emotional expression of the subject.

23 Claims, 6 Drawing Sheets

GENERATING ANIMATION FROM VISUAL AND AUDIO INPUT

FIELD

Embodiments of the invention relate to the field of computer graphics and animation. More particularly, embodiments of the invention relate to a technique for generating an animated character from audio and visual input.

BACKGROUND

Generation of animated characters from living beings is traditionally accomplished using either audio input, such as speech, from a subject or visual input, by tracking facial movement of the subject. Typically, speech from a human is captured and recorded and voice samples, known as phonemes, are extracted from the speech input. Phonemes are sounds within a spoken language, such as the "b" and "oo" in "book" in English. From these basic sounds, an animated character can be manipulated to mouth the speech, and thereby emulate a human speaker.

In other prior art techniques, video is captured and recorded and visual samples, known as visemes, are extracted from the captured video. Visemes are visual samples that correspond to facial features, such as mouth, teeth and tongue positions, when pronouncing phonemes. The visemes can then be stored in a database so that phonemes can be matched to a corresponding viseme.

Figure 1:
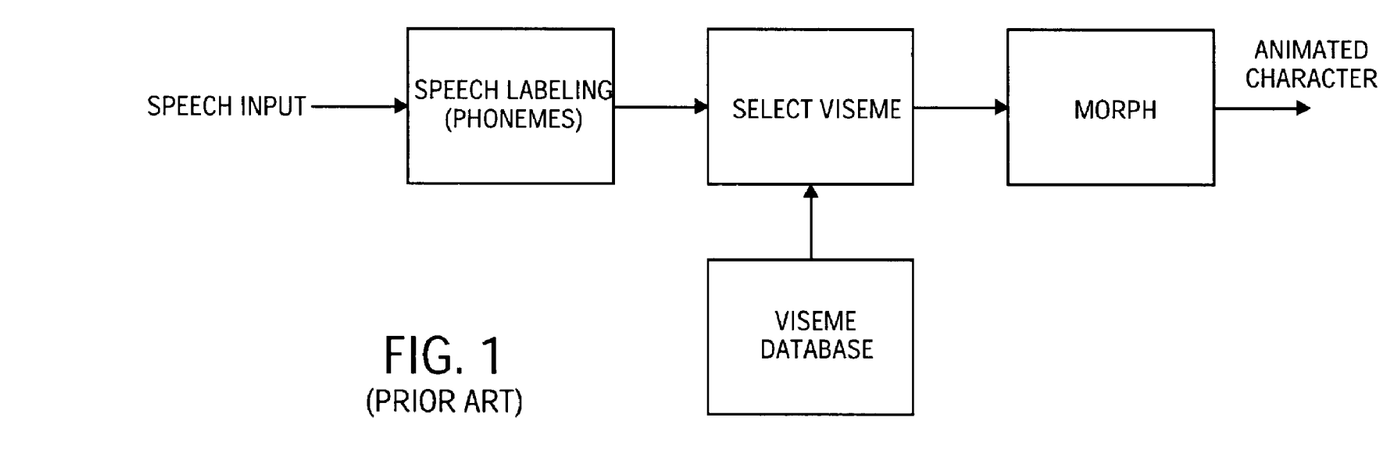
FIG. 1 is a prior art technique for generating animated characters from user speech input.

By matching visemes with corresponding phonemes and morphing consecutive visemes together, an animated character can be generated to emulate a human face during speech. An example of a prior art technique for generating facial animation from a human is illustrated in FIG. 1. One problem with the technique illustrated in FIG. 1 is that the actual expression of the person whose face is being modeled by the animated face is not portrayed in the animated face. Therefore, there's no variance in character expression for the same phonemes.

Another prior art technique involves tracking regions of an object during object movement and generating a corresponding animated object by mapping points within the tracked regions from the real object to the animated object. Features of a human face, such as the mouth, make certain shapes while the person is talking. In one prior art technique, points in the mouth region are tracked and mapped onto the final animated face. One problem with this technique is that sporadic errors in tracking and/or mapping input points to the animated character can cause noticeable distortion in the facial expression of the animated character.

Tracking and recognizing facial motions using parametric models of image motion is another technique for generating animated characters. These techniques typically model motions within facial regions rather than track individual feature points. One prior art technique uses affine models to model character facial motion. An affine model is a set of linear equations for modeling two-dimensional image motion. These equations can contain a number of parameters corresponding to motion, such as translation, rotation and scaling. Furthermore, affine models can use quadratic equations for expressing more complex motion types such as divergence and curl.

Figure 2:
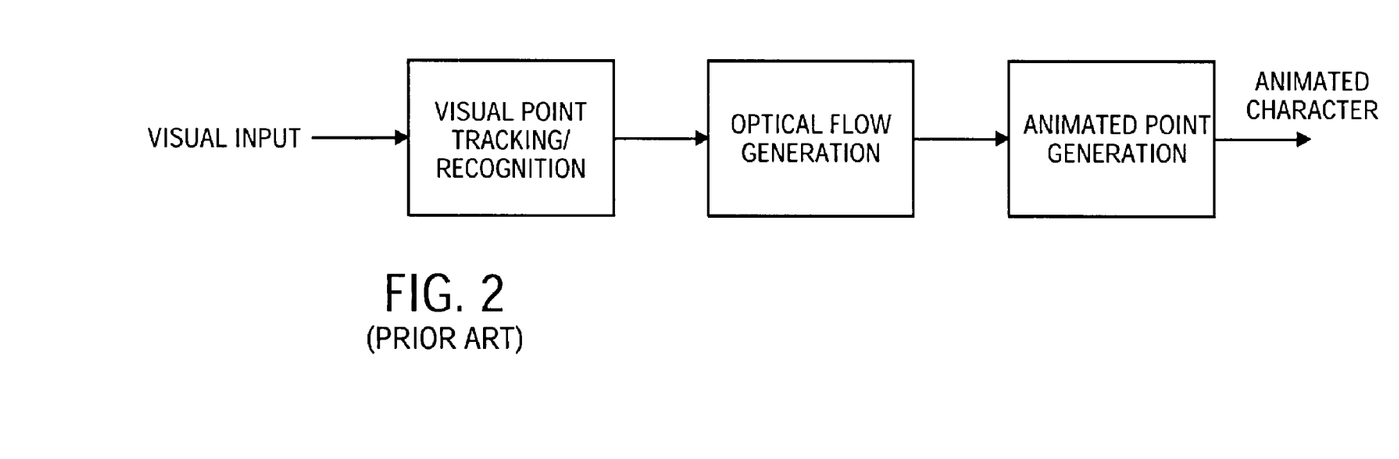
FIG. 2 is a prior art technique for generating animated characters from user visual input.

Another prior art technique is illustrated in FIG. 2. The technique illustrated in FIG. 2 tracks and recognizes facial motion using optical flow techniques to generate individual motion vectors corresponding to image points. These motion vectors may then be used to determine the final expression of the animated character.

Several prior art methods exist for generating an animated character from visual or speech input. These techniques, however, typically have shortcomings in their effectiveness of modeling real-time motion accurately and reliably.

BRIEF DESCRIPTION OF THE DRAWINGS

Embodiments and the invention are illustrated by way of example and not limitation in the figures of the accompanying drawings, in which like references indicate similar elements and in which.

DETAILED DESCRIPTION

Embodiments of the invention described herein relate to a technique for generating an animated character, such as a human face, using visual and audio input of a subject. Furthermore, embodiments of the invention are intended to provide reasonably accurate representations of a subject's movements, such as facial expression, in a reasonably reliable manner.

For one embodiment of the invention, a technique involves tracking movements of the subject, generating affine models based on those movements, and using the affine models to transform neutral visemes that have been selected according to the subject's speech phonemes. The transformed visemes may then be morphed together to create the final animated character.

For other embodiments, movement of the subject is tracked by calculating an optical flow of the subject's movement, which is then identified as an expression type in order to select from a number of emotion visemes that correspond to the subject's speech phonemes. The emotional visemes can then be morphed to produce the final animated character.

Still, in other embodiments, emotion visemes may be transformed according to motion models, such as affine models, in order to more accurately depict the emotion of the subject whom the generated animated character is to emulate.

Figure 3:
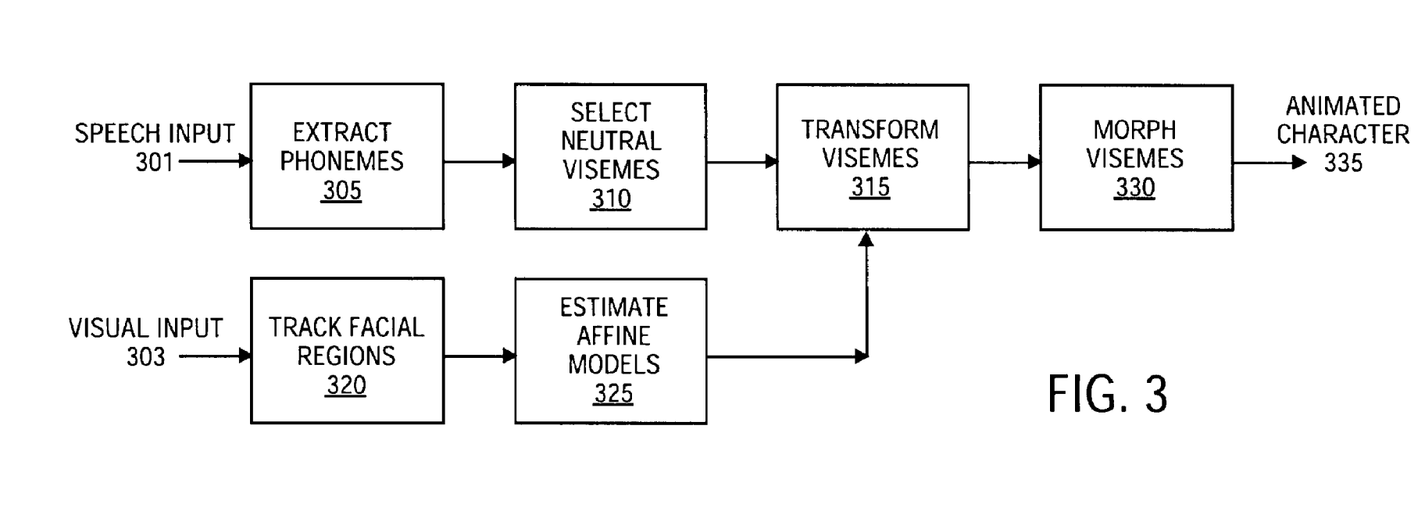
FIG. 3 is a technique for generating animated characters from user speech and visual input according to one embodiment of the invention.
Figure 4:
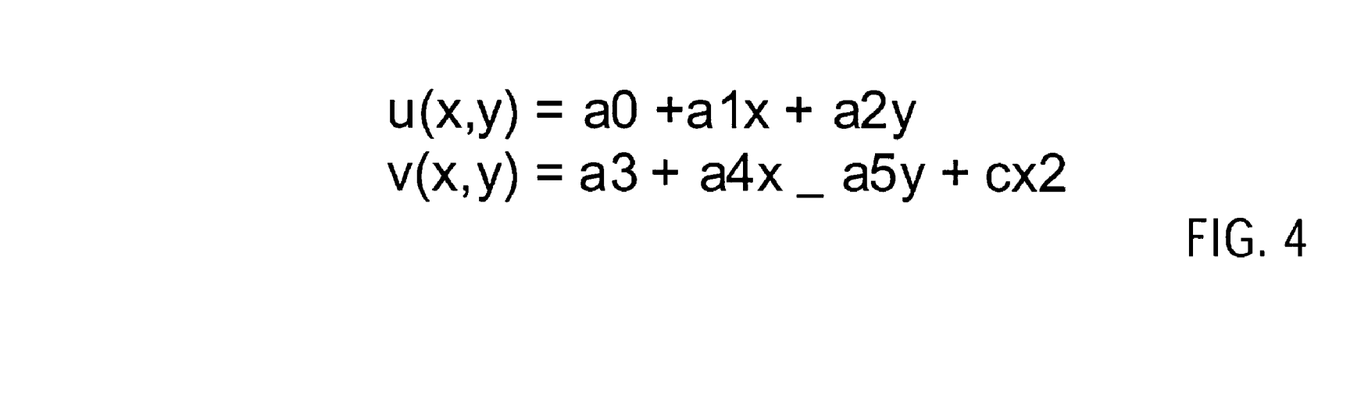
FIG. 4 illustrates an affine model that may be used in conjunction with one embodiment of the invention.

FIG. 3 illustrates one embodiment of the invention. Prior art methods may be used to extract phonemes at operation 305 from speech input 301 of a subject. Similarly, prior art methods may be used to track facial regions at operation 320 from an image 303 of the subject or another subject from which affine models may be estimated at operation 325. One affine model that may be used is illustrated in FIG. 4. Parameters $a_0$ through $a_5$ and c may be estimated by using prior art regression techniques. The result is an affine model to estimate the motion of the subject according to the x and y coordinates.

The estimated affine models may be used to transform the neutral visemes at operation 315 that have been selected at operation 310 according to the subject's extracted speech phonemes, such that a reasonably accurate depiction of the subject's movement is generated. The transformed visemes can then be morphed at operation 330 with each other according to prior art morphing techniques to generate smooth transitions between the transformed visemes. The result at operation 335 is a relatively accurate depiction of a subject's movement that is represented reasonably reliably.

Tracking and using the subject's actual movement, such as facial expression, enable the technique to accurately depict movement, whereas the use of the tracked movement to estimate an affine model which will then transform the neutral visemes is relatively reliable because errors in affine models may not often result in a noticeable anomaly in the resulting animated character.

Figure 5:
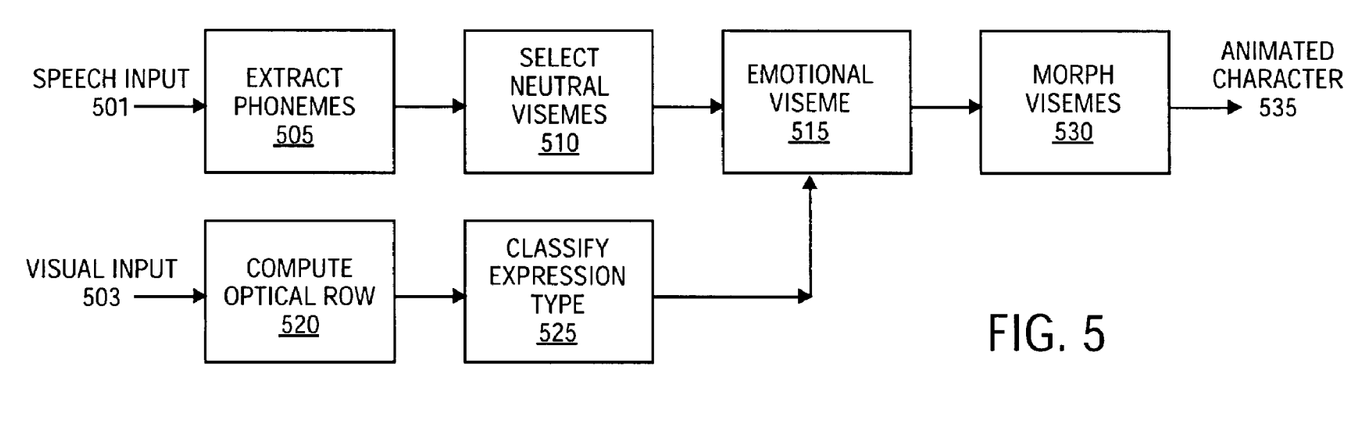
FIG. 5 is a technique for generating animated characters from user speech and visual input according to one embodiment of the invention.

FIG. 5 illustrates one embodiment of the invention. Similar to the embodiment illustrated in FIG. 3, the embodiment illustrated in FIG. 5 extracts phonemes from a subject's speech in order to select corresponding neutral visemes stored in a database, for example. However, the technique of FIG. 5 generates motion vectors from the subject's image to compute an optical flow at operation 520 of the movement, which is then identified as an expression type at operation 525 by, for example, a multi-layer perception neural network. For example, the optical flow may reveal motion in a subject's face that is consistent with a smile. Once this is detected and identified as a smile, a set of emotional visemes that contain variations of the subject's expression during a smile can be identified at operation 515. For example, the smile may be "smirk" with corresponding eye region position, or "surprise," etc.

For one embodiment the neutral visemes derived from the speech phonemes are used to select among a group of emotional visemes from which the expression classification can select an appropriate emotion viseme to be morphed and displayed. For the embodiment illustrated in FIG. 5, each emotional viseme group contains fifteen different representations of an identified expression. More or fewer expressions may be used in other embodiments.

For one embodiment of the invention, the neutral visemes may not be used to select an emotional viseme group, but rather the emotional visemes themselves may directly correspond to the extracted phonemes, thereby removing the need for storing neutral visemes altogether.

The result of the above embodiments is a reasonably accurate and reliable technique for modeling movement of a subject using an animated character. The technique is reasonably accurate because it is based on of the subject's actual movement, such as facial expression, and reasonably reliable because it does not depend on one-to-one point tracking of the subject's visual image but rather a selection of a representation of the subject's visual image; namely, the subject's expression type.

Figure 6:
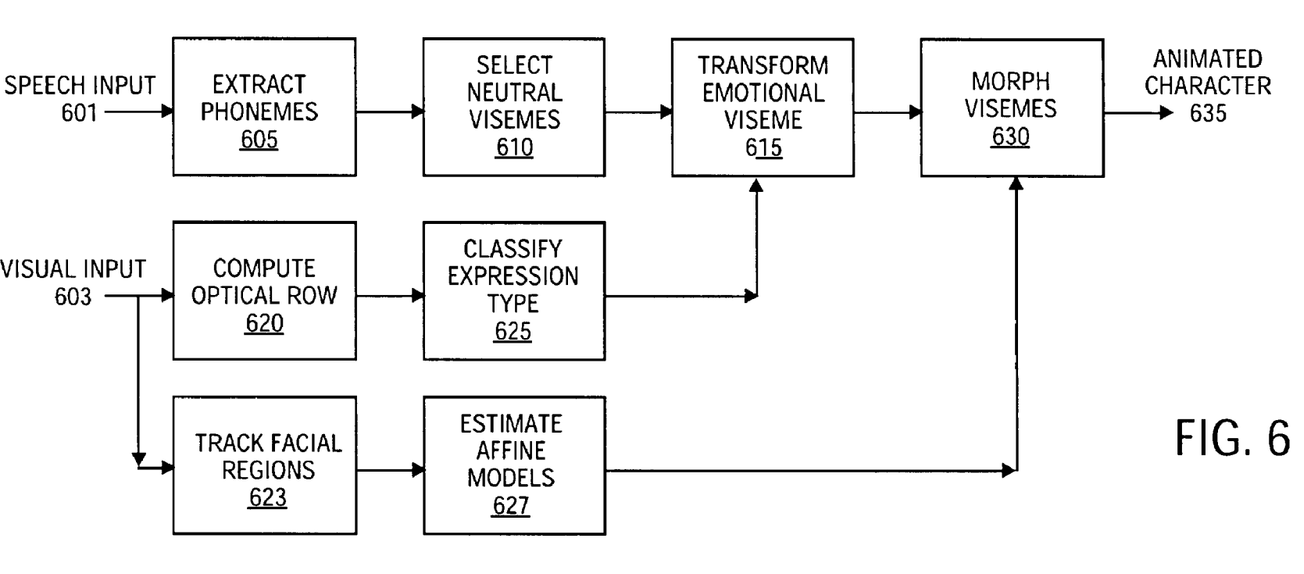
FIG. 6 is a technique for generating animated characters from user speech and visual input according to one embodiment of the invention.

FIG. 6 illustrates another embodiment of the invention. In the embodiment illustrated in FIG. 6, while the subject's motion is tracked via an optical flow representation at operation 620, which can then be used to classify an expression of the subject at operation 625, the subject's facial regions are also tracked at operation 623 in order to generate an affine model at operation 627 to represent the motion. The affine model may then be used to transform an emotional viseme at operation 617 selected according to the expression type that has been identified at operation 615. The transformed emotional viseme may then be morphed at operation 630 with other visemes to generate the final animated character 635.

In some embodiments of the invention illustrated in FIG. 6, the neutral viseme at operation 610 may not be selected at all, or its output may be configurable to bypass the emotional viseme selection step so that it is transformed directly.

The technique of FIG. 6 combines the motion modeling benefits of the embodiment of FIG. 3 with the reliable simplicity of the embodiment of FIG. 5. In this manner, the actual expression of the subject is transformed according to the subject's actual movement, so that a reasonably accurate representation of the subject can be achieved. Furthermore, small errors in the tracking of the motion are less noticeable since the tracking methods are used to select and transform a predetermined expression type rather than attempt to represent each point in the expression in a one-for-one manner.

Figure 7:
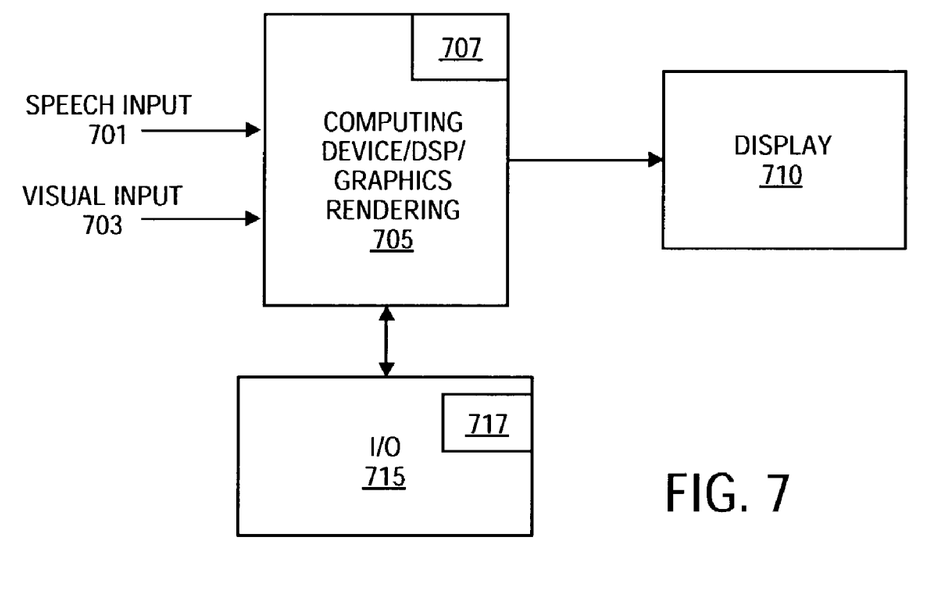
FIG. 7 is a flow diagram illustrating various embodiments of the invention for generating animated characters from speech and visual input.

FIG. 7 illustrates a system that may be used to implement one embodiment of the invention. The system consists of a speech input device 701, such as a microphone and video input device 703, such as a video camera to capture the user's speech and image, respectively. The outputs of the microphone and camera are fed into a computer system 705 implementing, among other things, graphics rendering capabilities, digital signal processing capabilities, and a processor to execute a program or programs in order to perform some or all the functions necessary for aspects of embodiments of the invention, such as extracting phonemes from the speech and selecting a neutral viseme from a database that corresponds to the phonemes. Finally, the rendered character can be displayed on the display 710 or written to a storage I/O device 715.

Similarly, the image captured by the camera may be fed into the computer system, in which a computer program 717 stored in the I/O device may be used to track facial regions, estimate affine models, compute optical flow, and/or classify the expression type of the user.

The computer system may also be used to execute a program 717 to transform visemes and/or select an appropriate emotional viseme before morphing the transformed or selected visemes together to generate a final animated character, which can be displayed on the computer system display.

The programs used in FIG. 7 may be implemented by a set of instructions stored on a machine-readable medium, such that when executed by a machine, such as the computer system of FIG. 7, they cause the machine to perform a method consistent with embodiments of the invention.

Alternatively, some or all of the programs used in FIG. 7 can be implemented using hardware devices 707, such as those using complimentary metal-oxide-semiconductor (CMOS) integrated circuit devices.

Figure 8:
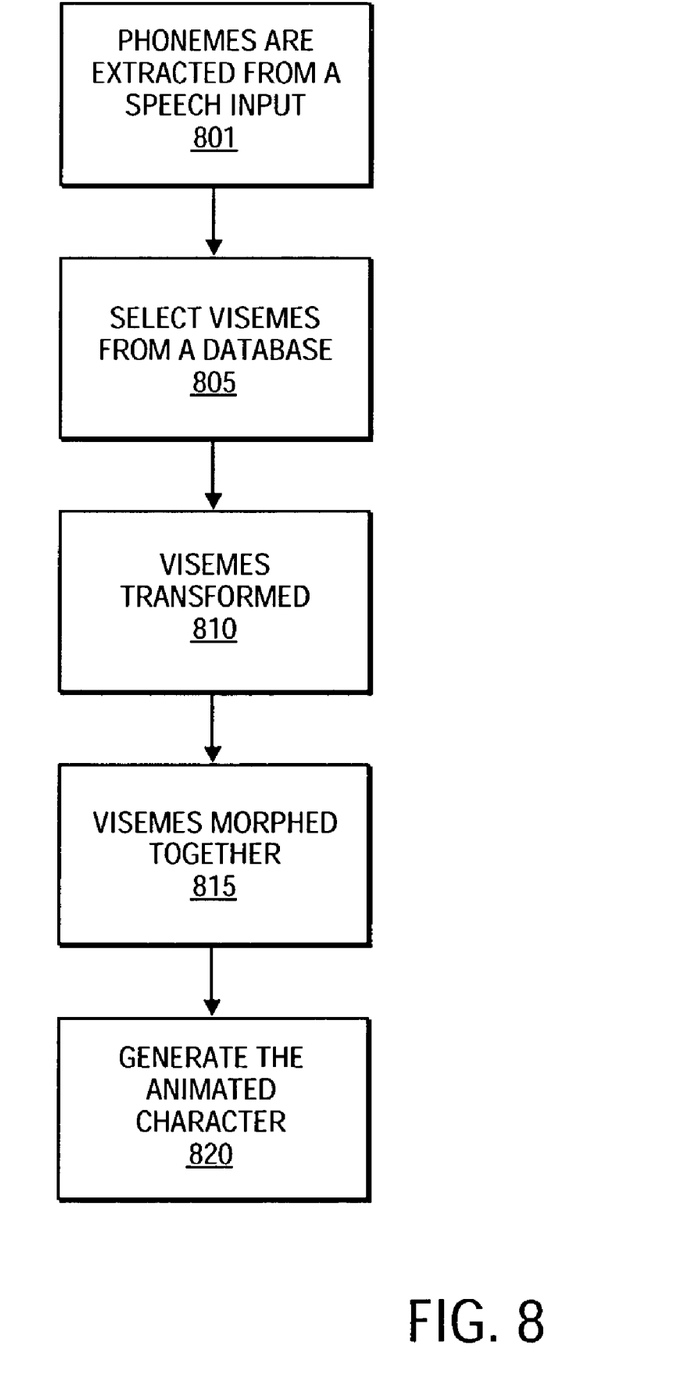
FIG. 8 is a system that may be used according to one embodiment of the invention.

FIG. 8 is a flow diagram illustrating a method according to one embodiment of the invention. Phonemes are extracted 801 from a speech input of a user, which are used to select visemes 805 from a database. The visemes may then be transformed 810 according to a visual input of the user's image, and the transformed visemes morphed together 815 to generate the animated character 820. For one embodiment, the visemes are neutral visemes that are generated to correspond to speech phonemes, whereas other embodiments include emotional visemes that represent a user's expressions and are selected by neutral visemes corresponding to the phonemes. Furthermore, for some embodiments, the visemes aren't translated at all, but rather selected from a database of visemes to represent various expressions of the user.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A machine-readable medium having stored thereon a set of instructions, which when executed by a machine cause the machine to perform a method comprising;
    receiving a visual input and a speech input;
    extracting a phoneme from the speech input; and
    identifying a plurality of emotional visemes based upon the phoneme;
    transforming one of the plurality of emotional visemes to generate a transformed emotional viseme.

2. The machine-readable medium of claim 1 further comprising computing an optical flow of the visual input.

3. The machine-readable medium of claim 2 further comprising classifying the optical flow according to an expression type.

4. The machine-readable medium of claim 3 further comprising selecting one of the plurality of emotional visemes corresponding to the expression type.

5. The machine-readable medium of claim 1 further comprising estimating an affine model according the visual input.

6. The machine-readable medium of claim 5 further comprising morphing the transformed emotional viseme with other emotional visemes.

7. The machine-readable medium of claim 1 further comprising selecting a neutral viseme corresponding to the phoneme.

8. The machine-readable medium of claim 7 wherein the neutral viseme is used to identify the plurality of emotional visemes.

9. A method comprising;
    extracting a plurality of phonemes from a speech input;
    selecting a plurality of visemes based upon the plurality of phonemes;
    transforming the plurality of visemes according to a visual input to generate a plurality of transformed visemes; and
    morphing the plurality of transformed visemes,
    wherein the visemes are emotional visemes to be modified according to emotional expression types.

10. The method of claim 9 wherein the plurality of visemes are neutral visemes.

11. The method of claim 10 wherein the neutral visemes are transformed according to a plurality of affine models.

12. The method of claim 9 wherein the plurality of visemes are emotional visemes.

13. The method of claim 12 wherein the emotional visemes are transformed according to a plurality of expression types.

14. An apparatus comprising:
    a first unit to extract phonemes from a speech input;
    a second unit to select visemes corresponding to the phonemes; and
    a third unit to modify the visemes according to a visual inputs,
    wherein the visemes are emotional visemes to be modified according to emotional expression types.

15. The apparatus of claim 14 wherein the visemes are neutral visemes to be modified according to an affine model.

16. The apparatus of claim 15 wherein the affine models correspond to regions of the visual input.

17. The apparatus of claim 16 wherein the neutral visemes are to be morphed with other visemes after the neutral visemes are modified.

18. The apparatus of claim 14 wherein the emotional expression types correspond to an optical flow of the visual input.

19. The apparatus of claim 18 wherein the emotional visemes are to be morphed with other visemes.

20. A system comprising:
    an image capturing device to capture a plurality of frames of a visual input;
    a sound capturing device to capture a plurality of samples of a sonic input;
    an extraction device to extract phonemes from the plurality of samples of the sonic input;
    a selection device to select visemes corresponding to the phonemes;
    a tracking device to track regions of the visual input;
    a transforming device to spatially transform the visemes according to an affine model; and
    a morphing device to morph the visemes after they are transformed by the transforming device.

21. The system of claim 20 wherein the visemes are neutral visemes.

22. The system of claim 20 wherein the visemes are emotional visemes to be selected according to a classification of expression type of the plurality of frames of visual input.

23. The system of claim 22 further comprising an optical flow computing device to compute an optical flow of the plurality of frames of the visual input.

* * * * *

UNITED STATES PATENT AND TRADEMARK OFFICE
CERTIFICATE OF CORRECTION

PATENT NO. : 7,257,538 B2  Page 1 of 1
APPLICATION NO. : 10/266226
DATED : August 14, 2007
INVENTOR(S) : Qian It is certified that error appears in the above-identified patent and that said Letters Patent is hereby corrected as shown below:

On the Title page, in field (57), in column 2, line 5, delete "expression" and insert -- expressions --, therefor.

In column 5, line 18, in Claim 1, after "comprising" delete ";" and insert -- : --, therefor.

In column 5, line 45, in Claim 9, after "comprising" delete ";" and insert -- : --, therefor.

In column 6, line 15, in Claim 14, delete "inputs" and insert -- input --, therefor.

Signed and Sealed this

Twentieth Day of May, 2008

JON W. DUDAS
*Director of the United States Patent and Trademark Office*